Figure 1:
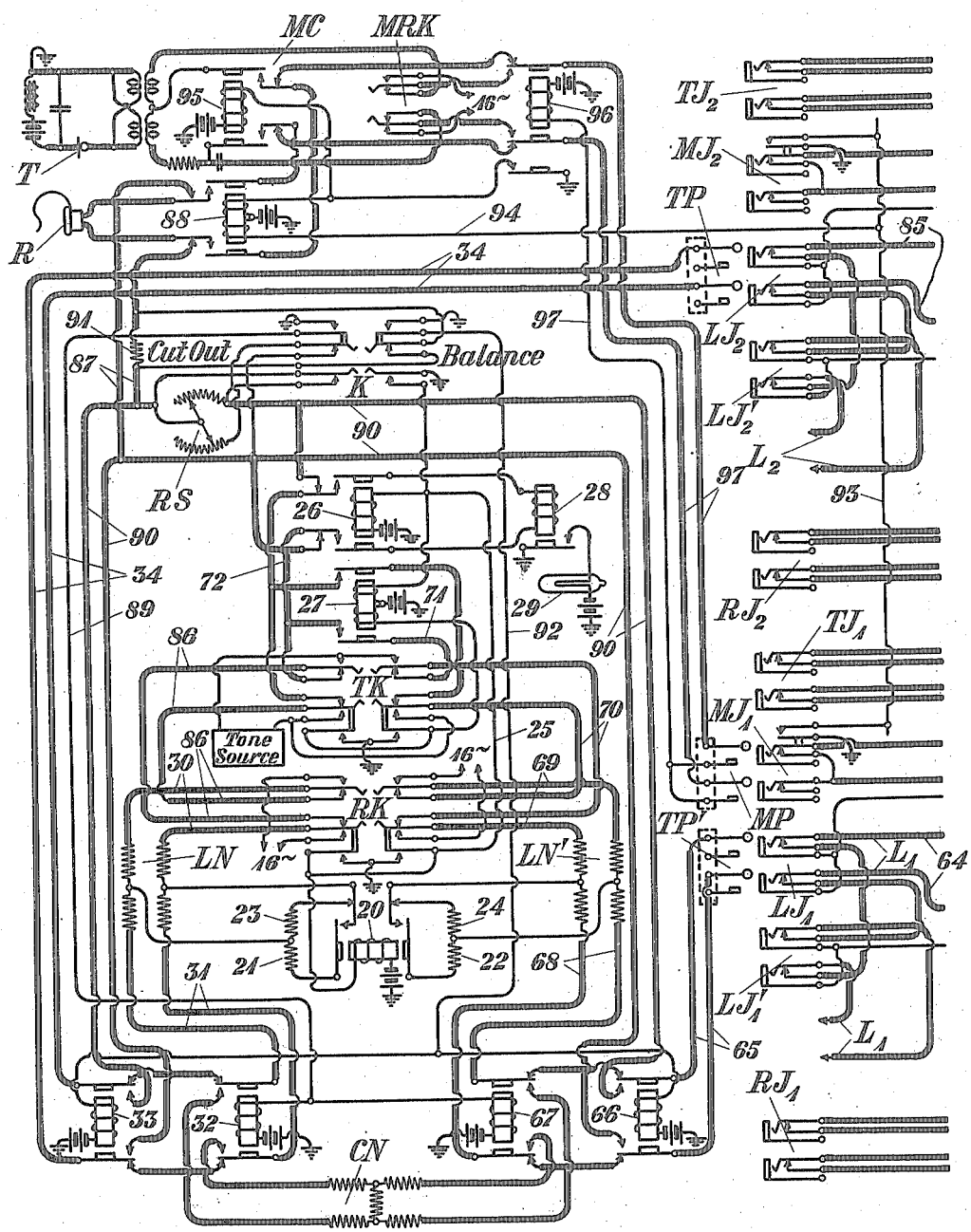

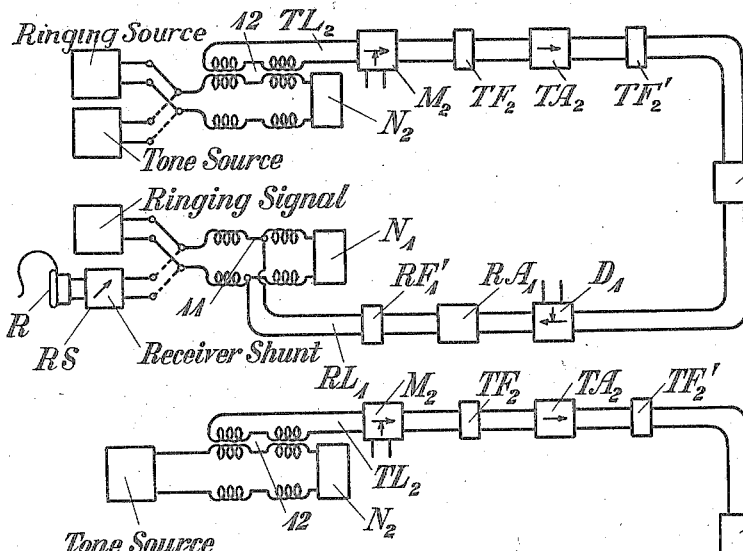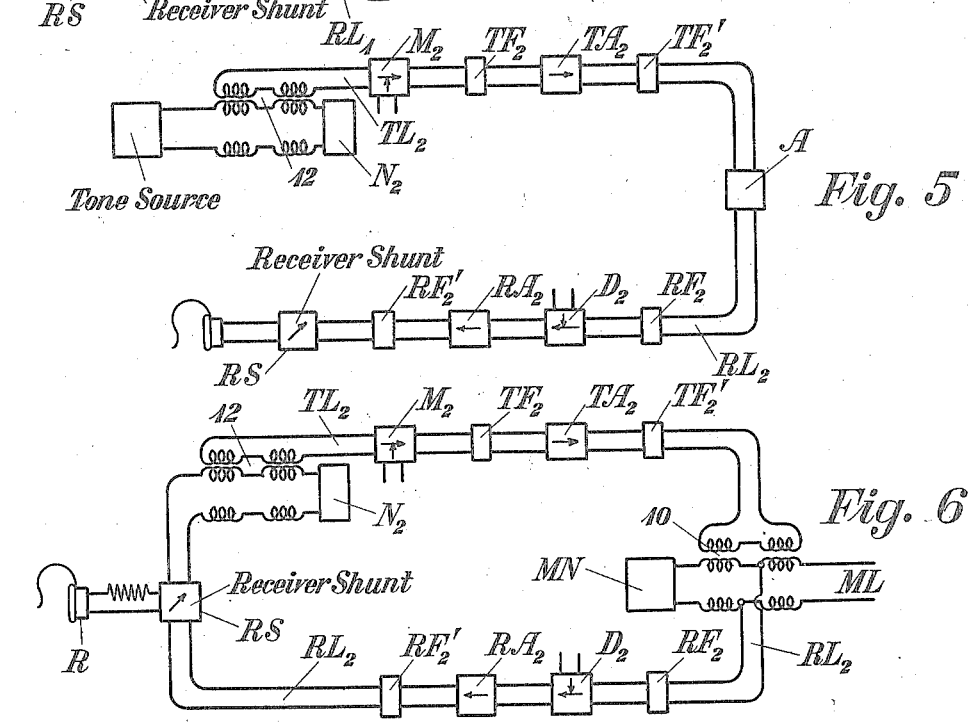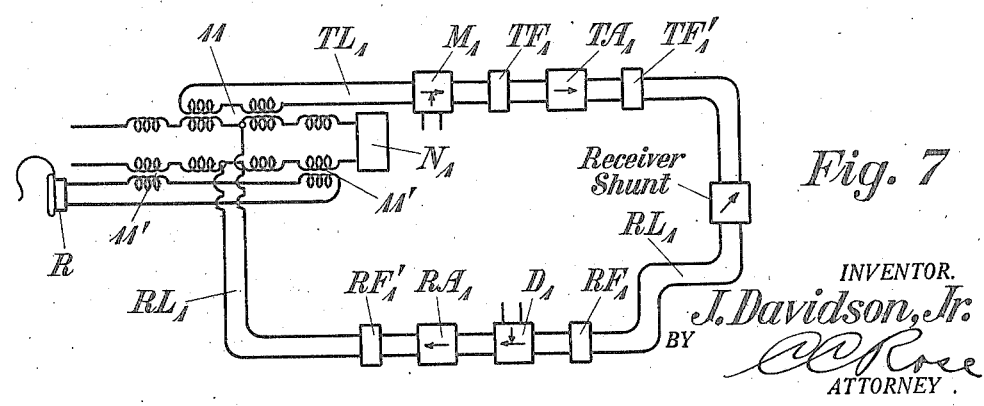

Patented Feb. 20, 1923.

1,445,759

UNITED STATES PATENT OFFICE.

JOHN DAVIDSON, JR., OF MONTCLAIR, NEW JERSEY, ASSIGNOR TO AMERICAN TELEPHONE AND TELEGRAPH COMPANY, A CORPORATION OF NEW YORK.

MEANS FOR AND METHOD OF TESTING MULTIPLEX CARRIER CIRCUITS.

Application filed September 25, 1919. Serial No. 326,192.

*To all whom it may concern:*

Be it known that I, JOHN DAVIDSON, Jr., residing at Montclair, in the county of Essex and State of New Jersey, have invented certain Improvements in Means for and Methods of Testing Multiplex Carrier Circuits, of which the following is a specification.

This invention relates to multiplex carrier systems and more particularly to methods of and for testing the transmission efficiency of certain of the apparatus used in connection with such systems.

A multiplex carrier system, as ordinarily set up, comprises a main carrier transmission line associated with a plurality of low frequency signaling lines such as telephone circuits, through a plurality of pairs of oppositely directed carrier channels, one being used for transmission in one direction and the other being used for transmission in the opposite direction. The pairs of oppositely directed carrier channels are rendered conjugate with respect to each other as regards the low frequency signaling circuit associated therewith, by means of a balanced transformer arrangement for associating them with the signaling circuit and an artificial line for balancing the low frequency signaling circuit at low frequencies. The various pairs of oppositely directed channels are associated with the carrier transmission circuit by connecting all of the channels transmitting in one direction to one common carrier circuit and all of the channels transmitting in the opposite direction to another common carrier circuit, the two carrier circuits being rendered conjugate by means of a balanced transformer arrangement similar to that described in connection with low frequency signaling circuits and an artificial line for balancing the common carrier circuit with respect to carrier frequencies.

The several balancing arrangements above described have considerable effect upon the transmission efficiency of the circuits. Furthermore, the various carrier channels include suitable modulating, demodulating, amplifying and filtering apparatus, all of which elements likewise enter into the transmission characteristics of the circuit. Since all of these elements may vary from time to time, it is desirable that some method be devised and some means be provided for making suitable transmission tests whereby the transmission condition of the circuits may be determined. Moreover, ringing apparatus is associated with the carrier channels for the purpose of transmitting ringing signals over the carrier transmission circuit and it is desirable that a method and a means for testing ringing apparatus should be available.

Accordingly it is proposed in accordance with this invention, to disconnect a transmitting and a receiving channel from the common carrier circuit and loop the disconnected ends of the channels together so that by associating a suitable indicating device with the receiving channel and by applying ringing current to the transmitting channel the ringing apparatus associated with one or both channels may be tested. In order to test the transmission efficiency of a carrier channel with regard to signaling currents, such as voice currents, it is proposed to loop a transmitting and receiving channel together in the manner just described and associate a variable impedance element and a receiver with the receiving channel, so that by applying a tone to the transmitting channel the effect upon the receiver may be noted. By comparing this effect with the effect due to the transmission of a similar tone over a circuit of known characteristics and by adjusting the variable impedance element until the same effect is secured in both cases, it is possible to determine the transmission efficiency of the circuit from the setting of the variable impedance element. If this element be suitably calibrated the transmission efficiency may be directly indicated in units of transmission gain.

In order to test the condition of balance at the junction between the carrier channels and the low frequency signaling circuit, or at the junction of the channels with the high frequency signaling circuit, it is proposed to disconnect the transmitting and receiving channel from the circuit whose balance is not to be tested and loop the disconnected ends together through a variable impedance element. By adjusting this impedance element until singing just commences or just ceases, the condition of balance at the undisturbed junction point may be determined from the setting of the variable impedance element.

In order to carry out the various tests above referred to, the invention provides a combined monitoring and testing circuit which may be associated with the low frequency sides of the various channels through suitable plugs and jacks. By various manipulations of controlling keys associated with the testing cord circuit, the circuits may be arranged to carry out the various tests above referred to.

Figure 2:
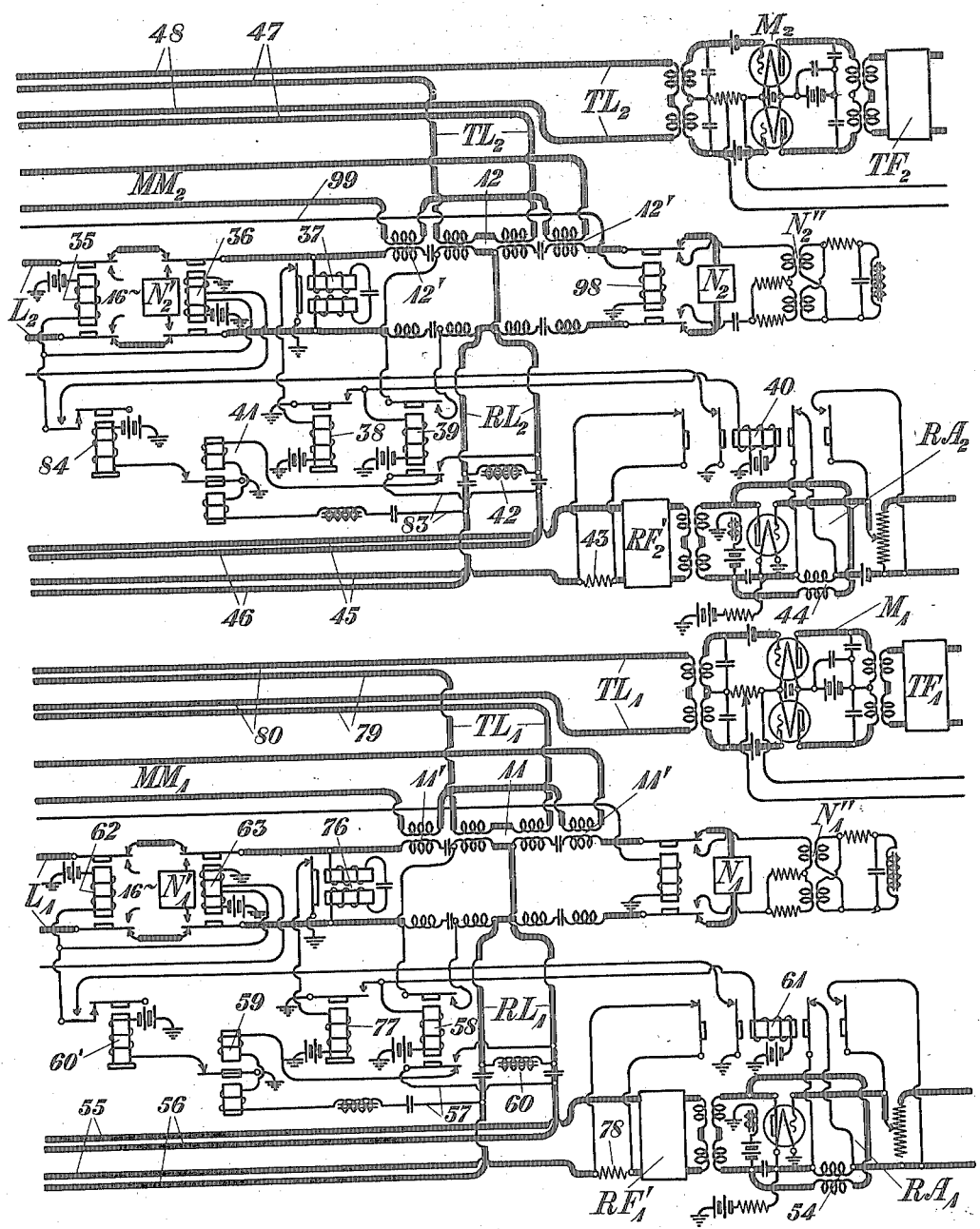
Figure 3:
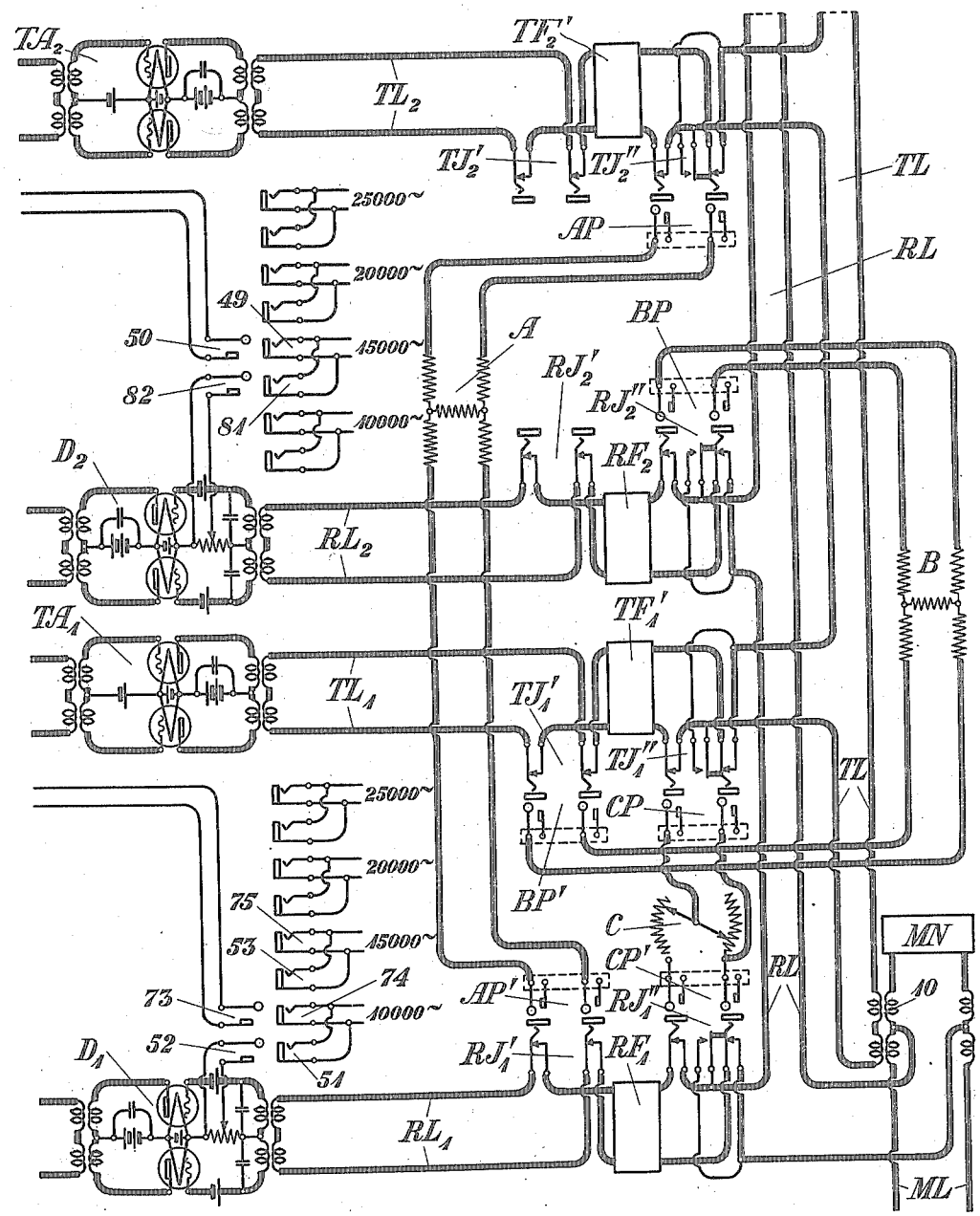

The invention may now be more fully understood by reference to the following description when read in connection with the accompanying drawing, Figures 1, 2 and 3 of which, when placed side by side in regular order, constitute a circuit diagram of an embodiment of the invention and Figures 4 to 7 of which are simplified diagrams indicating the circuit conditions during certain of the tests.

Referring to Figures 1, 2 and 3 ML designates a main carrier transmission line over which carrier currents may be transmitted. The line ML is associated with the common carrier transmitting circuit TL and the common carrier receiving circuit RL through a balanced transformer arrangement 10 and the circuits TL and RL are rendered substantially conjugate with respect to each other, so that electrical disturbances in the one will not affect the other, by balancing the line ML by means of an artificial line or network MN. $L_1$ and $L_2$ designate low frequency transmission lines which may be associated by means of balanced transformers 11 and 12 respectively, with pairs of transmitting and receiving channels which are connected with the common carrier circuits TL and RL. Thus the transmitting channel $TL_1$ and the receiving channel $RL_1$ are associated with the line $L_1$ through the transformer 11, while the transmitting channel $TL_2$ and the receiving channel $RL_2$ are associated with the line $L_2$ through the transformer 12. It will be understood, of course, that additional channels may be provided for additional low frequency lines, if desired.

The transmitting channel $TL_1$ includes a modulator $M_1$, a filter $TF_1$, an amplifier $TA_1$ and a filter $TF_1'$. the modulator $M_1$ may be of any well-known type, but is illustrated as a duplex balanced vacuum tube modulator of the general type disclosed in the U. S. patent to John R. Carson, No. 1,343,307 of June 15, 1920. The amplifier $TA_1$ may be of any well-known type, but is illustrated as a balanced duplex vacuum tube amplifier of the so-called "push-pull" type. This type is preferable for the reason that it causes a minimum distortion of high frequency currents.

The filter $TF_1$ is inserted between the modulator $M_1$ and the amplifier $TA_1$ for the purpose of preventing the transmission of low frequency currents such as voice currents, which might be passed through the modulator $M_1$ to the amplifier $TA_1$, thereby overloading the latter so that undesirable modulation would occur in the circuit of the amplifier. This filter is of the general type disclosed in the U. S. patents of George A. Campbell, Nos. 1,227,113 and 1,227,114, dated May 22, 1917, and is designed in accordance with the principle of said patent, to suppress all frequencies within the voice range, while freely transmitting all frequencies lying above said range. The filter $TF_1'$ is provided for the purpose of securing selectivity between the various transmitting channels and is likewise of the general type disclosed in the above mentioned patents to George A. Campbell. This filter is designed to transmit a band of frequencies extending either above or below the carrier frequency assigned to the channel, by an amount equal to ordinary voice range.

The receiving channel $RL_1$ includes a filter $RF_1$, a demodulator or detector $D_1$, an amplifier $RA_1$ and a filter $RF_1'$. The filter $RF_1$ may be identical in structure with the filter $TF_1'$ above described and may be arranged to transmit the same band of frequencies. The demodulator or detector $D_1$ is designed to translate carrier frequencies into low frequency signaling currents and while it may be of any well-known type is preferably a duplex balanced vacuum tube detector disclosed in the U. S. patent to John R. Carson, No. 1,343,308 of June 15. 1920. The detector described in said application of John R. Carson operates on the so-called homodyne principle of receiving and is therefore supplied with oscillations of the carrier frequency assigned to the channel for the purpose of "beating" the received modulated carrier currents.

The amplifier $RA_1$ may be of any well-known type, but is preferably a vacuum tube amplifier arranged to amplify detected low frequency voice or ringing currents. This amplifier is also arranged to function as a generator of oscillations of ringing frequency for transmission to the modulator $M_1$ in response to incoming ringing signals from the line $L_1$.

The filter $RF_1'$ is also of the general type described in the above mentioned patent to Campbell but is preferably so designed as to transmit telephone frequencies while suppressing frequencies above the telephone limit.

Apparatus similar to that just described will be associated with the transmitting channel $TL_2$ and the receiving channel $RL_2$. The filter $TF_2$, associated with the channel $TL_2$, may be identical in structure and may transmit the same range of frequencies as the filter $TF_1$. Likewise the filter $RF_2'$ may be identical with the filter $RF_1'$. The filters $TF_2'$ and $RF_2$ may be identical in structure and transmit the same band of frequencies, but this band will lie in the neighborhood of the carrier frequency assigned to these channels and will therefore be sufficiently removed from the band transmitted by the filters $TF_1'$ and $RF_1$ to provide for frequency selectivity.

In order to test the carrier apparatus above described, the monitoring and testing equipment shown in Figure 1 is provided. This includes a suitable monitoring cord MC, provided with a telephone set including a transmitter T and receiver R and terminating in plug MP adapted for cooperation with certain testing jacks associated with the lines $L_1$ and $L_2$ and the corresponding carrier channels. The testing cord proper terminates in plugs TP and TP' adapted for cooperation with certain of the testing jacks above referred to. These testing jacks comprise, in the case of the line $L_1$, monitoring jack $MJ_1$ associated with the monitoring circuit $MM_1$, line jacks $LJ_1$ and $LJ_1'$ associated with the line $L_1$, a transmitting jack $TJ_1$ associated with the transmitting channel $TL_1$ and a receiving jack $RJ_1$ associated with the receiving channel $RL_1$. A similar set of jacks is provided in connection with the line $L_2$.

The test cord above described is provided with networks LN and LN' for simulating the low frequency lines with which the carrier apparatus is associated. The test cord also includes a ringing key RK, whereby ringing current may be transmitted in either direction when the plugs TP and TP' are associated with a pair of carrier channels, a transmission test key TK, whereby a tone source may be applied to a transmitting channel and a receiver shunt RS and receiver R associated with a corresponding receiving channel. A key K is also provided, which, when thrown to the left, will apply the tone source and the receiver R to a comparison network CN, the connection with the carrier system being at the same time disconnected. By throwing this key to the right, the receiver shunt RS will be connected in a loop including a receiving and transmitting channel for testing the high frequency unbalance at the main line ML. In order to test the low frequency unbalance between a receiving and transmitting channel associated with a low frequency line, a special cord including a variable impedance element C in the form of a receiver shunt is provided, as indicated in Figure 3, said cord terminating in plugs CP and CP' adapted to cooperate with jacks such as $TJ_1''$ or $TJ_2''$ associated with the terminating channels $TL_1$ and $TL_2$ respectively, or with jacks such as $RJ_1''$ and $RJ_2''$ associated with the transmitting channels $RL_1$ and $RL_2$ respectively. By inserting the plugs CP and CP' in the jacks $TJ_1''$ and $RJ_1''$, respectively, the channels $TL_1$ and $RL_1$ may be disconnected from the main line ML and looped together through the impedance element C, so that the low frequency unbalance for the line $L_1$ may be determined.

In order to loop the high frequency ends of the channels together for various test purposes hereinafter described, additional cords including fixed networks A and B and terminating in plugs AP—AP' and BP—BP' are provided, these plugs being adapted to cooperate with jacks already described as being associated with the high frequency ends of the channels or with additional jacks located on the opposite sides of the selective band filters, these jacks being designated as $RJ_1'$, $TJ_1'$, $RJ_2'$ and $TJ_2'$.

Further details of the apparatus will be clear from a detailed description of the operation, which is as follows:

Assuming it is desired to test ringing apparatus associated with the line $L_2$ and the carrier channels $TL_2$ and $RL_2$, a loop connection will be established from the line side of the filter $TF_2'$ of the transmitting channel $TL_2$ to the receiving channel $RL_1$ on the drop side of the filter $RF_1$. This loop connection may be established by inserting plug AP in the jack $TJ_2''$ and the plug AP' in the jack $RJ_1'$, so that the channel $TL_2$ and the channel $RL_1$ are looped together through an impedance element A, which simulates the impedance of the main line ML as regards carrier frequencies. The loop connection above described will serve for testing the ringing apparatus associated with the line $L_2$ for transmission in one direction. For testing the receiving portion of the ringing apparatus associated with the line $L_2$, the channel $RL_2$ should be looped to the channel $TL_1$. This may be done by inserting plugs BP and BP' in the jacks $RJ_2''$ and $TJ_1'$ respectively, thus looping the two channels through the impedance element B, which may simulate the impedance of the line ML.

The plug TP of the test circuit of Figure 1 is now inserted in the line jack $LJ_2$ and the plug TP' is inserted in the line jack $LJ_1$. By this operation the lines $L_1$ and $L_2$ are disconnected from the terminals of the carrier apparatus and the test circuit is connected thereto, the artificial lines LN and LN' taking the place of the lines $L_1$ and $L_2$. The condition of the circuit is now as indicated in Figure 4, with the channels $TL_2$ and $RL_1$ looped together in series through the impedance A, so that by applying a ringing source to the line $L_1$ and by associating a ringing signal responsive device with the line $L_2$ ringing current may be transmitted over the loop to actuate the signal.

Returning now to the diagram of Figures 1, 2 and 3, upon throwing the ringing key RK to the left, ground is connected over the lower make contact of said key to the winding of relay 20, which upon operating substitutes resistances 21 and 22 for the resistances 23 and 24, as the shunt elements of the artificial lines LN and LN' respectively. This adjusts the transmission efficiency of these networks to the desired value for ringing transmission. At the same time ground is connected over the lower make contact of key RK and over conductor 25 to the winding of relay 26 and the upper winding of relay 27, energizing both relays. Relay 26 associates the ringing responsive relay 28 with the testing circuit, while relay 27 completes the connection from the relay 28 over the front contacts of relay 26, front contacts of relay 27 and the normal transmission contacts of keys TK and RK to the network LN'.

Ringing current is now transmitted over the left hand make contact of key RK, conductors 30, network LN, conductors 31, back contacts of relay 32, back contacts of relay 33, over conductors 34, tip contacts of plug TP, tip contacts of jack $LJ_2$, back contacts of relay 35, back contacts of relay 36 and through the winding of ringing responsive relay 37. Relay 37, in response to the ringing current thus transmitted, opens the circuit of slow-acting relay 38, which completes the circuits of relays 39 and 40. Relay 39 opens the circuit of ringing responsive relay 41 to prevent false operation thereof, short-circuits the condenser of the filter 42 and short-circuits the line terminals of the transformer 12, so as to unbalance the transformer. The relay 40 removes the short circuit from the resistance 43 at its extreme left hand contact and at its inner left hand contact opens a ground connection to prevent false operation of relays 35 and 36. At its outer right hand contact relay 40 short circuits the potentiometer in the input circuit of amplifier $RA_2$ and at its inner right hand contact removes the short circuit from about the secondary winding of transformer 44, so that the feed back circuit of the amplifier $RA_2$ becomes effective. The amplifier $RA_2$ now generates ringing current of some desirable frequency, such as 133 cycles per second. The ringing current generated is transmitted through the filter $TF_2'$ over conductors 45, contacts of jack $RJ_2$, conductors 46, through transformer 12, over conductors 47, contacts of jack $TJ_2$, conductors 48 to the modulator $M_2$. The 133 cycle ringing current impressed upon the modulator $M_2$ modulates carrier current of 15,000 cycles frequency transmitted over the contact of jack 49 and plug 50 to the modulator. The modulated carrier current is now transmitted through the filter $TF_2$, amplified by the amplifier $TA_2$ and passes over the normal contact of jack $TJ_2'$ to the filter $TF_2'$. After passing through the filter $TF_2'$ the current flows over the contacts of jack $TJ_2''$ and plug AP through the network A and over the contacts of plug AP' and jack $RJ_1'$ to the circuit $RL_1$.

It will be noted that the connection through the network A to the channel $RL_1$ is to the left of the filter $RF_1$ which, it will be remembered, transmits a different range from the filter $TF_2'$. It is necessary to make this connection to the left of the filter $RF_1$, in order that current of the frequency transmitted through the filter $TF_2'$ may be transmitted to the circuit $RL_1$, as the filter $RF_1$ would tend to suppress current of the desired frequency. The detector $D_1$ is normally supplied with current of 10,000 cycles frequency over the contacts of jack 51 and plug 52. Since the basic carrier frequency of the channel $TL_2$ is 15,000 cycles, it is necessary that the detector $D_1$ be supplied with current of this same frequency, instead of 10,000 cycles, consequently the plug 52 is withdrawn from the jack 51 and is inserted in the jack 53 before making the test, thereby supplying 15,000 cycles to the detector $D_1$.

The 15,000 cycle current modulated by 133 cycle ringing current and impressed on the circuit $RL_1$ reacts in the detector $D_1$ with unmodulated current of 15,000 cycle frequency, so that 133 cycle ringing current is detected and appears in the output circuit of the detector $D_1$. This low frequency current is transmitted to the amplifier $RA_1$ for amplification. It will be noted that one of the windings of the transformer 54 in the feed back circuit of this amplifier is short-circuited, so that the amplifier does not function as a generator, but acts as an ordinary amplifier to amplify the 133 cycle current which is then passed through the low pass filter $RF_1'$, over conductors 55, contacts of jack $RJ_1$ and conductors 56 to the bridge including conductors 57 and over the back contact of relay 58 to the winding of ringing responsive relay 59, which is responsive to 133 cycle current. The filter 60 operates to prevent the transmission of 133 cycle current over the circuit $RL_1$ beyond the points across which the relay 59 is bridged.

Relay 59 is now energized and opens the circuit of slow-acting relay 60, which releases its armature, completing the circuit from ground over the inner back contact of relay 61, make contact of relay 60' and thence in parallel through the winding of relay 62 to battery and through the lower winding of relay 63 to battery. Relay 62 disconnects the line $L_1$ from the transformer 11 and applies 16 cycle ringing current thereto; at the same time the relay 63 substitutes the network $N_1'$ for the line $L_1$, in order to maintain the balance of the circuit.

Sixteen cycle ringing current transmitted over the front contacts of the relay 62 passes over conductors 64, tip contacts of jack $LJ_1$, tip contacts of plug TP', conductors 65, back contacts of relays 66 and 67, conductors 68, network LN', conductors 69, normal right hand contacts of key RK, conductors 70, normal right hand contacts of key TK, conductors 71, front contacts of relay 27, conductors 72 and over the front contacts of relay 26 to the winding of relay 28, which is responsive to 16 cycle ringing current. Relay 28 is now energized and operates the signal 29, thereby indicating that the transmitting ringing apparatus associated with the channel $TL_2$ and the receiving ringing apparatus associated with the channel $RL_1$ are functioning properly.

In order to similarly test the ringing apparatus associated with the channel $RL_2$ and incidentally the transmitting ringing apparatus associated with the channel $TL_1$, the key RK should be thrown to the right. During this test the modulator $M_1$ must be supplied with 15,000 cycle current instead of 10,000 cycle current and consequently plug 73 will be withdrawn from the jack 74 and inserted in the jack 75.

The operation of the ringing key RK as just described completes the circuits of relays 20, 26 and 27 for the same purpose as described in connection with the operation of the key RK to the left. Sixteen cycle ringing current is now transmitted over the make right hand contacts of key RK, conductors 69, network LN', conductors 68, back contacts of relays 67 and 66, conductors 65, tip contacts of plugs TP' and jack $LJ_1$, conductors 64, back contacts of relays 62 and 63 to the windings of ringing responsive relay 76. The actuation of relay 76 opens the circuit of slow-acting relay 77, which upon being deenergized, connects ground to the windings of relays 58 and 61. Relay 58 short-circuits the line $L_1$ to unbalance the transformer 11, opens the circuit of relay 59 to prevent false operation thereof and short-circuits one condenser of the filter 60, in order that the filter may freely pass 133 cycle ringing current. Relay 61 removes the short circuit from about the resistance 78, disconnects ground from the contact of relay 60, short-circuits the potentiometer of the amplifier RA' and removes the short circuit from the secondary of the transformer 54, thereby rendering the feed back of the amplifier operative.

The amplifier $RA_1$ now functions as a generator to generate 133 cycle ringing current which is transmitted through the filter $RF_1'$, over conductors 55, contacts of jack $RJ_1$, conductors 56, through the partially short-circuited filter 60, through the transformer 11, over conductors 79, contacts of jack $TJ_1$ and conductors 80 to the modulator $M_1$. The 133 cycle current now operates upon the modulator $M_1$ to modulate 15,000 cycle carrier current supplied thereto and the modulated carrier current is transmitted through the filter $TF_1$, amplified by the amplifier $TA_1$ and then transmitted over the tip contacts of jack $TJ_1'$ and plug BP', through the network B, tip contacts of plug BP and jack $RJ_2''$, through the filter $RF_2$, over the contacts of jack $RJ_2'$ to the detector $D_2$. The 15,000 cycle carrier current modulated at 133 cycles reacts in the detector $D_2$ with 15,000 cycle current supplied to said detector over the contacts of the jack 81 and the plug 82, so that 133 cycle ringing current is detected and appears in the output circuit of the detector $D_2$. This ringing current is now amplified by the amplifier $RA_2$, the secondary of the transformer 44 of which is short-circuited, and the amplified ringing current passes through the filter $RF_2'$, over conductors 45, contacts of jack $RJ_2$, conductors 46, conductors 83, over the back contact of relay 39 to the windings of ringing responsive relay 41.

The filter 42 prevents the 133 cycle ringing current from being transmitted beyond the bridge connection including the relay 41. Relay 41, upon being energized, opens the circuit of slow-acting relay 84, which at its make contact completes a circuit from ground over the inner left hand back contact of relay 40, back contact of relay 84 and thence in parallel through the winding of relay 35 to battery and through the lower winding of relay 36 to battery. Relay 35 applies 16 cycle ringing current to conductors 85, while relay 36 substitutes the network $N_2$ for the line $L_1$ to maintain the balance of the circuit.

Sixteen cycle ringing current now flows over the front contacts of relay 35, over conductors 85, tip contacts of jack $LJ_2$ and plug TP, over conductors 34, back contacts of relays 33 and 32, conductors 31, network LN, conductors 30, left hand normal contacts of key RK, conductors 86, normal left hand contacts of key TK, conductors 72 and over front contacts of relay 26 to the winding of relay 28. Relay 28 operates the signal 29, thereby indicating the satisfactory operation of the riging apparatus.

If it is desired to make a transmission test, the loop connections of the channels may be permitted to remain as just described. With the ringing key RK restored to normal, the talking key TK may now be thrown to the left. This completes a circuit from ground over lower left hand make contact of TK, through the lower winding of relay 27, energizing said relay. It will be noted that relay 26 is not energized by this operation, so that conductors 72 are connected not to the relay 28 but to the receiver shunt RS and the receiver R. The condition of the channels $TL_2$ and $RL_1$ will now be as indicated in Figure 4, with the switches at the left thrown to their dotted line positions.

With the key TK thrown to the left test current from the tone source is transmitted over the left hand make contacts of key TK, over conductors 86, normal contacts of key RK, conductors 30, network LN, conductors 31, back contacts of relays 32 and 33, conductors 34, contacts of plug TP and jack $LJ_2$, conductors 85, back contacts of relays 35 and 36, through the windings of transformer 12, conductors 47, contacts of jack $TJ_2$, conductors 48 to the modulator $M_2$. The tone current now modulates the carrier current and the modulated current is transmitted through the filter $TF_2$, amplified by the amplifier $TA_2$, then passes over the contacts of jack $TJ_2'$ through the filter $TF_2'$ over the tip contacts of jack $TJ_2''$ and jack AP, through the network A, over the tip contacts of plug AP' and jack $RJ_1'$ to the detector $D_1$.

The detector $D_1$ translates the modulated carrier current into the low frequency tone current, which is amplified by the amplifier $RA_1$, passes through the filter $RF_1'$, over conductors 55, contacts of jack $RJ_1$, conductors 56, through the filter 60 to the midpoints of the windings of transformer 11. At this point the energy divides, half flowing to the artificial line N' and the other half flowing over the back contacts of relays 63 and 62, over conductors 64, tip contacts of jack $LJ_1$ and plug TP' conductors 65, back contacts of relays 66 and 67, conductors 68, network LN', conductors 69, normal right hand contacts of key RK, conductors 70, normal right hand contacts of talking key TK, conductors 71, front contacts of relay 27, conductors 72, back contacts of relay 26, through the receiver shunt RS and over conductors 87 and back contacts of relay 88, to the receiver R.

By adjusting the receiver shunt RS, the volume of the tone may be given any desired value. In order to determine the actual transmission equivalent of the loop circuit, however, it is necessary to make a comparison test. For this purpose the key K is thrown to its left hand or cut-out position, thereby completing a circuit from ground over the upper left hand make contact of key K, over conductor 89 and through the windings of relays 32 and 67 in parallel, to battery. Current from the tone source now flows over the left hand make contacts of key TK, over conductors 86, normal contacts of key RK, conductors 30, network LN, conductors 31, front contacts of relay 32, network CN, front contacts of relay 67, conductors 68, network LN', conductors 69, normal contacts of key RK, conductors 70, normal right hand contacts of key TK, conductors 71, front contacts of relay 27, back contacts of relay 26, and over conductors 87 and the back contacts of relay 88 to the receiver R. It will be noted that the operation of the key K to the left results in opening the shunt resistance of the receiver shunt RS and short-circuiting the series resistance so that the receiver shunt RS is not effective in the circuit just described, consequently the volume of the tone heard in the receiver R will always have a definite value, dependent upon the transmission characteristics of the network CN. By comparing this tone with the tone heard over the loop circuit and by adjusting the receiver shunt in the latter circuit until the tone in both cases is the same, the transmission of the loop circuit may be determined from the setting of the receiver shunt RS. Thus, if the network CN has a transmission equivalent of nine miles and the network A has a transmission equivalent of thirty miles and if, further, the setting of the receiver shunt RS indicated a loss of fifteen miles, it will be evident, that the net transmission gain in the loop circuit will be equal to the total loss in the circuit (thirty miles of artificial line plus fifteen miles loss in the receiver shunt equals 45 miles) minus the loss in the comparison circuit of nine miles; in other words, the transmission gain in the loop will be 36 miles.

A similar test of the transmission over the loop including the channel $TL_1$, network B and channel $RL_2$ may be made by throwing the key TK to the right. As this operation will be similar to that just described, it is unnecessary to describe it in detail. It will be noted that during the tone tests the operation of the key TK does not result in the energization of the relay 20 as described in connection with the operation of the ringing key, consequently the resistances 23 and 24 constitute the shunt resistances of the networks LN and LN' respectively, so that the transmission efficiency of these networks will be substantially equal to that of lines such as $L_1$, $L_2$, etc. at talking frequencies.

If it be desired to test the transmission of the loop, including the channels $TL_2$ and $RL_2$, for instance, these two channels may be looped together through the network A, by inserting plug AP in jack $TJ_2''$ and by inserting the plug AP' in the jack $RJ_2''$.

The plug TP of the testing circuit may remain inserted in the jack $LJ_2$, while the plug TP' of the testing circuit will be inserted in the jack $RJ_2$. The circuit conditions are now as indicated in schematic form in Figure 5.

Upon throwing the key TK to the left, current from the tone source will be transmitted over a path previously traced through the testing circuit to the plug TP, over the tip contacts of said plug and jack $LJ_2$, over the back contacts of relays 35 and 36, through the transformer 12, conductors 47 and 48, to the modulator $M_2$. The modulated carrier current is then transmitted through the filter $TF_2$, amplified by the amplifier $TA_2$, passed through the filter $TF_2'$ and the current then flows over the tip contacts of jack $TJ_2''$ and plug AP through the network A, tip contacts of plug AP' and jack $RJ_2''$ and through the filter $RF_2$ to the detector $D_2$. The detector $D_2$ detects the low frequency tone current, which is amplified by the amplifier $RA_2$ and transmitted through the filter $RF_2'$, over the conductors 45, tip contacts of jack $RJ_2$ and plug TP' and over a circuit previously traced, through the testing cord to the receiver R. A comparison test is now made, as before, and the transmission equivalent of the loop determined, as above described.

The loop test just discussed included the loss of the transformer 12 in the loop. If it is desired to make a test without including the transformer 12, the plugs TP and TP' may be inserted in jacks $TJ_2$ and $RJ_2$ respectively. In this case the current from the tone source flows over the tip contact of plug TP and jack $TJ_2$ and over conductors 48 to the modulator, otherwise the operation is as before described.

In order to make a high frequency balance test between a given transmitting and receiving channel, as for instance channels $TL_2$ and $RL_2$, the cords including networks such as A, B, etc. will be withdrawn from the jacks and the two channels will be connected to the main line MN in their normal manner. The plug TP of the testing cord will be inserted in jack $LJ_2$ and the plug TP' will be inserted in the jack $RJ_2$. With keys TK and RK restored to normal, the key K may be thrown to the right, thereby connecting ground to the winding of relay 26, upper winding of relay 27 and the winding of relay 20. These relays are energized, but the actuation of relays 20 and 27 is without any useful effect. The actuation of the relay 26, however, serves to disconnect conductors 72 from the test loop 90. The operation of key K also serves to open a short circuit about the resistance 91, which is now included in circuit with the receiver R, the receiver R being thus bridged across the test loop 90 by a circuit of high impedance. A circuit is completed over the upper right hand make contact of key K, over conductor 92 and thence in parallel through the windings of relays 33 and 36, to battery. The operation of these relays connects the plugs TP and TP' to the test circuit 90, which includes the receiver shunt RS.

The circuit conditions are now as indicated in schematic form in Figure 6, so that the low frequency ends of the channels $TL_2$ and $RL_2$ are looped together through the receiver shunt RS, while their high frequency ends are associated with the main line ML through the balancing arrangement, thus forming a closed loop which is capable of singing if the amplification exceeds the loss. The loop may be traced in detail as follows:

From the left hand side of the receiver shunt RS, over conductors 90, front contacts of relay 33, conductors 34, tip contacts of plug TP and jack $LJ_2$, conductors 85, back contacts of relays 35 and 36, through transformer 12, conductors 47 and 48, modulator $M_2$, filter $TF_2$, amplifier $TA_2$, filter $TF_2'$, common transmitting circuit TL, transformer 10, common receiving circuit RL, filter $RF_2$, detector $D_2$, amplifier $RA_2$, filter $RF_2'$, conductors 45, tip contacts of jack $RJ_2$ and plug TP', conductors 65, front contacts of relays 66, and over the loop 90 to the receiver shunt RS. If the receiver shunt happens to be so set that the circuit sings, it should be adjusted until singing just ceases. If, on the other hand, it happened to be so set that singing was not taking place, it should be adjusted until singing commences. In either case, the receiver shunt will be adjusted to the same point, which is the point at which the total loss in the closed loop is just equal to the total gain. The setting of the receiver shunt is therefore a measure of the unbalance with respect to the main line ML. This will be apparent when it is considered that if the balance with regard to the line ML were perfect singing would not take place in the circuit, even though the impedance of the receiver shunt RS be set to zero, since under conditions of perfect balance no transmission could take place between the circuit TL and the circuit RL. If, then, it is necessary to interpolate a given impedance into the circuit by means of the receiver shunt RS, in order to prevent singing, the amount of impedance inserted in the circuit is obviously proportional to the degree of unbalance.

In order to make a low frequency unbalance test with regard to a pair of channels, for instance the channels $TL_1$ and $RL_1$, the plugs TP and TP' should be withdrawn and the special cord, including the network C of Figure 3, which is similar to a receiver shunt, should be connected to the channels by inserting the plug CP and CP' in jacks $TJ_1''$ and $RJ_1''$ respectively. This results in looping the two channels together through the network C, while disconnecting them from the common circuits TL and RL and the main line ML.

In order to "listen in" on the loop to determine whether or not singing is taking place, the plug MP of the monitoring cord MC may be inserted in the monitoring jack $MJ_1$. This completes the circuit from ground over the upper make contact of jack $MJ_1$, over conductors 93 and 94 and through the lower winding of relay 88. Relay 88, upon being energized, connects the receiver R over its front contacts, over the back contacts of relay 95, back contacts of relay 96 and over conductors 97, over the tip contacts of the plug MP and jack $MJ_1$ to the monitoring circuit $MM_1$ which is associated, through the balanced transformer arrangement 11', with the channels $TL_1$ and $RL_1$.

The circuit is now in the condition indicated by the schematic diagram shown in Figure 7. The closed loop may be traced from the transformer 11 over conductors 79 and 80, modulator $M_1$, filter $TF_1$, amplifier $TA_1$, filter $TF_1'$, tip contacts of jack $TJ_1''$, and plug CP, network C, tip contacts of plug CP' and jack $RJ_1''$, filter $RF_1$, detector $D_1$, amplifier $RA_1$, filter $RF_1'$, conductors 55 and 56 and through filter 60 to the midpoints of the windings of transformer 11.

By adjusting the network C until singing in the circuit just commences, or, if singing was already taking place, until it just ceases, the setting of the element C will be a measure of the unbalance between the channels $TL_1$ and $RL_1$ with respect to the line $L_1$, for the same reasons as described in connection with the high frequency unbalance test.

If it is desired to talk or ring over a low frequency line, as for instance the line $L_2$, the monitoring cord MC may be used by inserting the plug MP in the jack $LJ_2'$. A circuit is now completed from ground through the upper winding of relay 36, over the sleeve contacts of the jack $LJ_2'$ and plug MP and over the conductor 97, through the winding of the relay 96, to battery. Relay 36 is energized and substitutes the network $N_2'$ for the line $L_2$ to maintain the carrier circuit balance. Relay 96, upon being energized, at its lower front contact completes circuits through the winding of relay 95 and the upper winding of relay 88, energizing both relays. Relay 95 bridges the receiver R in parallel with one winding of the transformer of the talking set over a circuit including the front contacts of relay 95 and the front contacts of relay 88. The operator may now talk over the line $L_2$ and by operating the monitoring ringing key MRK, may ring over the line $L_2$. If the operator desires to talk or ring over the carrier circuit associated with a low frequency line, such as the line $L_2$, the plug MP may be inserted in the jack $LJ_2$. A circuit is now completed from ground through the winding of a relay 98, over conductor 99, sleeve contacts of the plug and jack, over conductor 97 and through the winding of relay 96, to battery. The operation of relay 96 produces the same results as before. The operation of the relay 97 substitutes a network $N_2''$ for the network $N_2$, the substituted network being designed to simulate the talking set of the monitoring cord MC, so that the circuit is balanced. The transmission of talking or ringing current from the monitoring cord over the channel $TL_2$ to the distant station and from the distant station back to the monitoring cord, over the channel $RL_2$ will take place in the normal manner and need not be further described.

It will be obvious that the general principles herein disclosed may be embodied in many other organizations widely different from those illustrated, without departing from the spirit of the invention as defined in the following claims:

What is claimed is:

1. In a multiplex carrier system comprising a plurality of low frequency signaling circuits associated with a common carrier transmission circuit through pairs of carrier channels for transmitting in opposite directions, each pair of channels being individual to a low frequency signaling circuit and having ringing apparatus associated therewith, the method of testing the ringing apparatus associated with a transmitting channel which consists in disconnecting said transmitting channel and a receiving channel from said common carrier circuit, interconnecting the disconnected ends of said channels so that transmission may take place directly from one to the other, applying ringing current to said transmitting channel and observing the effect of the ringing current upon the receiving circuit.

2. In a multiplex carrier system comprising a plurality of low frequency signaling circuits associated with a common carrier transmission circuit through pairs of carrier channels for transmitting in opposite directions, each pair of channels being individual to a low frequency signaling circuit and having ringing apparatus associated therewith, the method of testing the ringing apparatus associated with a receiving channel, which consists in disconnecting said receiving channel and a transmitting channel from the carrier transmission circuit, interconnecting the disconnected ends of said channels so that transmission may take place from one to the other, applying ringing current to the transmitting channel and observing the effect of the ringing current so applied upon the receiving circuit.

3. In a multiplex carrier system comprising a plurality of low frequency signaling circuits associated with a common carrier transmission circuit through pairs of carrier channels for transmitting in opposite directions, each pair of channels being individual to a low frequency signaling circuit and having ringing apparatus associated therewith, the method of testing the ringing apparatus associated with carrier channels, which consists in disconnecting a transmitting channel of one pair of carrier channels and a receiving channel of another pair of carrier channels from said carrier transmission circuit, interconnecting the disconnected ends of the transmitting and receiving channel so that transmission may take place from one to the other, applying ringing current to the low frequency signaling circuit terminals associated with the transmitting channel and impressing the resultant ringing current received in the receiving channel over the low frequency signaling circuit terminals thereof upon an indicator.

4. In a multiplex carrier system comprising a plurality of low frequency signaling circuits associated with a common carrier transmission circuit through pairs of carrier channels for transmitting in opposite directions, each pair of channels being individual to a low frequency signaling circuit, the method of testing the transmission efficiency of a carrier channel, which consists in disconnecting a transmitting and a receiving carrier channel from the carrier transmission circuit, looping the disconnected ends of said channels together so that transmission may take place from one to the other, applying signaling current to the transmitting channel and measuring the effect of the resultant received current in the receiving channel.

5. In a multiplex carrier system comprising a plurality of low frequency signaling circuits associated with a common carrier transmission circuit through pairs of carrier channels for transmitting in opposite directions, each pair of channels being individual to a low frequency signaling circuit, the method of testing the transmission efficiency of a carrier channel, which consists in disconnecting a transmitting and a receiving channel from the carrier transmission circuit, looping together the disconnected ends of said channels so that transmission may take place from one to the other, impressing signaling current from a suitable source upon the transmitting channel, applying the resultant signaling current appearing in the receiving circuit upon an indicator, impressing signaling current having the same characteristics as that applied to the transmitting channel, upon said indicator through a circuit of known transmission characteristics and comparing the resultant effects upon the indicator.

6. In a multiplex carrier system comprising a plurality of low frequency signaling circuits associated with a common carrier transmission circuit through pairs of carrier channels for transmitting in opposite directions, each pair of channels being individual to a low frequency signaling circuit, the method of testing the transmission efficiency of a carrier channel, which consists in disconnecting a transmitting channel and a receiving channel from the carrier transmission circuit, looping together the disconnected ends of said channels so that transmission may take place from one to the other, impressing signaling current from a suitable source upon the transmitting channel, impressing the resultant current appearing in the receiving channel upon an indicator through a variable impedance element, applying signaling current having similar characteristics upon said indicator, through a circuit having known transmission characteristics, and adjusting said variable impedance element until the same effect is produced upon the indicator by transmission over said carrier channels as is produced by transmission over said circuit of known characteristics.

7. In a multiplex carrier system, a plurality of low frequency signaling circuits, a common carrier transmission circuit, a transmitting carrier channel and a receiving carrier channel interconnecting each low frequency signaling circuit with said carrier transmission circuit, ringing apparatus associated with said channels, means whereby a transmitting channel and a receiving channel may be looped together independent of said carrier transmission circuit, so that transmission may take place from one channel to the other, means to apply ringing current to said transmitting channel, and means to indicate the effect of the resultant current appearing in the receiving channel.

8. In a multiplex carrier system, a plurality of low frequency signaling circuits, a common carrier transmission circuit, a transmitting carrier channel and a receiving carrier channel interconnecting each low frequency signaling circuit with said carrier transmission circuit, ringing apparatus associated with said channels, means whereby the transmitting channel corresponding to one low frequency signaling circuit may be looped to a receiving channel corresponding to another low frequency signaling circuit, said loop connection being independent of said carrier transmission circuit, means whereby ringing current may be applied to the signaling circuit terminals of said transmitting channel, an indicator, and means to associate said indicator with the signaling circuit terminals of the receiving channel, whereby the effect of the ringing current upon the ringing apparatus associated with the channels may be indicated.

9. In a multiplex carrier system, a plurality of low frequency signaling circuits, a common carrier transmission circuit, a transmitting carrier channel and a receiving carrier channel for associating each low frequency signaling circuit with the common carrier circuit, means whereby a transmitting channel may be looped to a receiving channel independent of said carrier transmission circuit, means for applying signaling currents to said transmitting channel, and means to indicate the effect of the resultant currents appearing in the receiving channel.

10. In a multiplex carrier system, a plurality of low frequency signaling circuits, a common carrier transmission circuit, a transmitting carrier channel and a receiving carrier channel for associating each low frequency signaling circuit with the common carrier circuit, means whereby a transmitting channel may be looped to a receiving channel independent of said carrier transmission circuit, so that transmission may take place from the one channel to the other, means whereby signaling currents may be applied to said transmitting channel, receiving apparatus, means whereby said receiving apparatus may be associated with said receiving channel to indicate the effect of the resultant currents appearing therein, means whereby similar signaling currents may be applied to said receiving apparatus over a circuit of known transmission characteristics, whereby the transmission efficiency of said looped channels may be compared with that of said circuit of known characteristics.

11. In a multiplex carrier system, a plurality of low frequency signaled circuits, a common carrier transmission circuit, a transmitting carrier channel and a receiving carrier channel for associating each low frequency signaling circuit with the common carrier circuit, means whereby a transmitting channel may be looped to a receiving channel independent of said carrier transmission circuit, so that transmission may take place from one channel to the other, a test circuit of known transmission characteristics, a receiving instrument, means for impressing signaling currents over said test circuit to said receiving instrument, means to associate said receiving instrument with the looped receiving channel through a variable impedance element, means to apply signaling currents having similar characteristics to the transmitting channel which is looped to said receiving channel, and means whereby the impedance of said variable impedance element may be adjusted until the same effect is produced upon said receiving instrument as was produced when signaling current was transmitted over said circuit of known characteristics.

12. In a multiplex carrier transmission system, a carrier transmission circuit, a low frequency signaling circuit, oppositely directed carrier channels interconnected with said circuits in such a manner that the channels will be conjugate with respect to each other, test jacks associated with said channels and said signaling circuit, a testing circuit including test plugs and a variable impedance element, means whereby when said test plugs are inserted in certain of said testing jacks said oppositely directed channels will be disconnected from said signaling circuit without disturbing their connection with said carrier transmission circuit, and will be interconnected through said variable impedance elements.

13. In a multiplex carrier transmission system, a carrier transmission circuit, a low frequency signaling circuit, oppositely directed carrier channels interconnected with said circuits in such a manner that said channels will be conjugate with respect to each other, one of said channels being used for transmitting and the other of said channels being used for receiving, a test jack associated with said low frequency signaling circuit, a second test jack associated with said receiving channel, a testing circuit including a pair of test plugs and a variable impedance element, and means whereby when said test plugs are inserted in said test jacks the oppositely directed channels will be disconnected from said low frequency signaling circuit and will be interconnected through said variable impedance element.

14. In a multiplex carrier system, a carrier transmission circuit, a low frequency signaling circuit, oppositely directed carrier channels interconnected with said circuits in such a manner that said channels will be conjugate with respect to each other, test jacks associated with said channels, a test cord including test plugs and a variable impedance element, and means whereby when said test plugs are associated with said test jacks said oppositely directed channels will be disconnected from said carrier transmission circuit without disturbing their connection with said low frequency signaling circuit and will be interconnected through said variable impedance element.

15. In a multiplex carrier system, a carrier transmission circuit, a low frequency signaling circuit, oppositely directed carrier channels interconnected with said circuits in such a manner that said channels will be conjugate with respect to each other, test jacks associated with said channels, a test cord including test plugs and a variable impedance element, means whereby when said test plugs are associated with said test jacks said oppositely directed channels will be disconnected from said carrier transmission circuit without disturbing their connection with said low frequency signaling circuit and will be interconnected through said variable impedance element, a monitoring circuit associated with said low frequency signaling circuit, a receiving instrument, and means whereby said receiving instrument may be associated with said monitoring circuit.

16. The combination with a multiplex carrier apparatus comprising a carrier transmission circuit, a plurality of low frequency signaling circuits, pairs of oppositely directed carrier channels interconnecting said circuits in such a manner that the channels of each pair will be conjugate with respect to each other, and testing jacks associated with said low frequency line and said carrier channels; of a testing apparatus comprising a plurality of testing plugs, a source of ringing current, a signal responsive to ringing current, a tone source, a receiver and a receiver shunt, an auxiliary test circuit and a plurality of controlling keys whereby when certain of said test plugs are associated with said test jacks and certain of said controlling keys operated, two oppositely directed carrier channels will be looped together and ringing current will be transmitted from said testing apparatus over the loop to the indicating device associated with said testing apparatus, and whereby, upon the operation of other of said keys, said tone source will be associated with one end of the loop, and said receiver shunt, and receiver with the other end of the loop, while upon the operation of a different key said tone source will be connected to one end of said auxiliary test circuit, while said receiver will be connected to the other end of said auxiliary test circuit, the association of certain of said test plugs with other test jacks and the manipulation of certain of said controlling keys resulting in looping a pair of oppositely directed channels through said receiver shunt, without disturbing the connection of said channels with said carrier transmission circuit.

In testimony whereof, I have signed my name to this specification this 22nd day of September, 1919.

JOHN DAVIDSON, Jr.